United States Patent
Liu et al.

(10) Patent No.: US 12,269,120 B2
(45) Date of Patent: Apr. 8, 2025

(54) GAS ASSISTANCE DEVICE FOR LASER WELDING AND LASER WELDING SYSTEM

(71) Applicant: TRUMPF (China) Co., Ltd., Suzhou (CN)

(72) Inventors: Yuan Liu, Suzhou (CN); Zekai Hou, Suzhou (CN); Franz Lehleuter, Suzhou (CN)

(73) Assignee: TRUMPF (CHINA) CO., LTD., Taicang (CN)

(*) Notice: Subject to any disclaimer, the term of this patent is extended or adjusted under 35 U.S.C. 154(b) by 0 days.

(21) Appl. No.: 18/779,113

(22) Filed: Jul. 22, 2024

(65) Prior Publication Data
US 2024/0375217 A1    Nov. 14, 2024

Related U.S. Application Data

(63) Continuation of application No. PCT/CN2024/072471, filed on Jan. 16, 2024.

(30) Foreign Application Priority Data
Jan. 20, 2023 (CN) .......................... 202310062941.7

(51) Int. Cl.
  *B23K 26/12* (2014.01)
  *B23K 26/21* (2014.01)

(52) U.S. Cl.
  CPC ............ *B23K 26/127* (2013.01); *B23K 26/21* (2015.10)

(58) Field of Classification Search
  CPC ....... B23K 26/127; B23K 26/21; B23K 26/00

USPC ..................................................... 219/121.63
See application file for complete search history.

(56) References Cited

U.S. PATENT DOCUMENTS

| | | | | |
|---|---|---|---|---|
| 4,000,392 A | * | 12/1976 | Banas | B23K 26/12 |
| | | | | 219/121.84 |
| 4,078,167 A | * | 3/1978 | Banas | B23K 26/702 |
| | | | | 219/121.84 |
| 4,095,080 A | * | 6/1978 | Ueyama | B23K 9/164 |
| | | | | 219/137.41 |
| 5,281,798 A | * | 1/1994 | Hamm | B23K 26/40 |
| | | | | 250/226 |
| 5,359,176 A | * | 10/1994 | Balliet, Jr. | B23K 26/1476 |
| | | | | 219/121.84 |

(Continued)

FOREIGN PATENT DOCUMENTS

| | | | | |
|---|---|---|---|---|
| CN | 102672349 A | * | 9/2012 | ........... B23K 26/142 |
| CN | 112171054 A | | 1/2021 | |
| WO | WO 2022235003 A1 | | 11/2022 | |

*Primary Examiner* — Jimmy Chou
(74) *Attorney, Agent, or Firm* — LEYDIG, VOIT & MAYER, LTD.

(57) ABSTRACT

A gas assistance device for laser welding includes an assistance gas unit configured to apply an assistance gas to a site to be welded, and a fume suction unit configured to suck fumes generated during laser welding. The assistance gas unit is provided with an assistance gas nozzle. The fume suction unit is provided with a fume suction port. The assistance gas nozzle includes a first slit-shaped opening. The fume suction port includes a second slit-shaped opening. The fume suction unit is at least partially attached to the assistance gas unit. In an operating state of the gas assistance device, the second slit-shaped opening is at least partially located above the first slit-shaped opening.

20 Claims, 3 Drawing Sheets

(56) References Cited

U.S. PATENT DOCUMENTS

| | | | | |
|---|---|---|---|---|
| 5,662,762 | A * | 9/1997 | Ranalli | B29C 63/0013 156/707 |
| 7,863,542 | B2 * | 1/2011 | Murase | B23K 26/16 219/121.84 |
| 8,207,472 | B2 * | 6/2012 | Kosmowski | B23K 26/14 219/121.72 |
| 8,283,596 | B2 * | 10/2012 | Murase | B23K 26/0732 219/121.72 |
| 9,061,304 | B2 * | 6/2015 | Miller | B23K 26/36 |
| 10,456,863 | B2 * | 10/2019 | Ashihara | B08B 15/04 |
| 10,525,554 | B2 * | 1/2020 | Orlandi | B23K 26/38 |
| 11,141,808 | B2 * | 10/2021 | Mehn | B23K 9/325 |
| 11,148,229 | B2 * | 10/2021 | Kim | B23K 26/147 |
| 11,298,772 | B2 * | 4/2022 | Terada | B23K 26/1462 |
| 11,342,478 | B2 * | 5/2022 | Nie | H01L 21/7806 |
| 11,376,642 | B2 * | 7/2022 | Leisner | B08B 15/002 |
| 2003/0217809 | A1 * | 11/2003 | Morishige | B23K 26/03 118/724 |
| 2004/0226927 | A1 * | 11/2004 | Morikazu | B23K 26/142 219/121.84 |
| 2006/0226136 | A1 * | 10/2006 | Zamuner | B08B 15/04 219/137.41 |
| 2007/0145026 | A1 * | 6/2007 | Murase | B23K 26/1462 219/121.84 |
| 2008/0210675 | A1 * | 9/2008 | Sasaki | B23K 26/142 219/121.84 |
| 2008/0296258 | A1 * | 12/2008 | Elliott | B23K 26/142 134/1 |
| 2009/0314753 | A1 * | 12/2009 | Kosmowski | B23K 26/147 219/121.72 |
| 2010/0276396 | A1 * | 11/2010 | Cooper | B23K 35/368 219/74 |
| 2015/0000232 | A1 * | 1/2015 | Hammers | B08B 15/002 55/385.1 |
| 2015/0034615 | A1 * | 2/2015 | Luzius | B23K 26/142 219/121.84 |
| 2015/0352667 | A1 * | 12/2015 | Hemes | B23K 26/144 219/121.61 |
| 2016/0101483 | A1 * | 4/2016 | Kawada | B23K 26/1462 219/121.84 |
| 2016/0129527 | A1 * | 5/2016 | Moon | B23K 26/38 425/174.4 |
| 2016/0303688 | A1 * | 10/2016 | De Souza | B23K 26/21 |
| 2017/0043432 | A1 * | 2/2017 | Yoshii | B23K 26/142 |
| 2018/0200832 | A1 * | 7/2018 | Izumi | B23K 26/1436 |
| 2018/0315627 | A1 * | 11/2018 | Ito | C03B 25/025 |
| 2021/0276132 | A1 * | 9/2021 | Komatsu | B23K 26/1476 |

* cited by examiner

GAS ASSISTANCE DEVICE FOR LASER WELDING AND LASER WELDING SYSTEM

CROSS-REFERENCE TO RELATED APPLICATIONS

This application is a continuation of International Application No. PCT/CN2024/072471, filed on Jan. 16, 2024, and claims benefit to Chinese Patent Application No. CN 202310062941.7, filed on Jan. 20, 2023. The aforementioned applications are hereby incorporated by reference herein.

FIELD

Embodiments of the present disclosure relate to a gas assistance device for laser welding and a corresponding laser welding system.

BACKGROUND

Lithium batteries are widely used in various electronic devices and transport vehicles, e.g., electric vehicles, due to multiple benefits such as high specific energy, long cycle life, low self-discharge, no memory effect, and no pollution, etc. When used in vehicles, lithium batteries can also be referred to as power batteries.

Lithium batteries usually include a battery case body and a battery case cover plate fixed thereto. At present, the battery case cover plate is usually fixedly connected to the battery case body by the laser welding process.

During laser welding, in order to prevent oxidation and reduce porosity, it is necessary to provide partial gas shielding during the welding process. The existing laser welding process mainly involves using a stationary welding head to weld the battery case cover plate to the battery case body, and at the same time a shielding gas is ejected from a nozzle on the laser head. However, this method is not suitable for the sealing welding of the peripheries of the battery case cover plate and the battery case body.

For this reason, a proposal has been raised to use a separate device for applying shielding gases to cooperate with a scanner welding head having higher welding efficiency for welding. For example, the applicant of the present disclosure has proposed a shielding gas applying device for ejecting a shielding gas around a periphery of a battery case cover plate (see CN112171054A, for example, which is incorporated herein in its entirety as reference).

For another thing, fumes generated during the welding process need to be sucked out, since fumes are not only harmful to the health of the operator, but also has a direct impact on the formation of weld joints. For example, during the formation of weld joints, fumes will affect the propagation of lasers, hindering the weld joints from achieving the desired quality.

Currently, a separate suction pipe is usually provided to suck out fumes. However, if not properly arranged, this method may be unable to cover the entire welding path but leave suction gaps, and may further affect the ejection of the shielding gas, for example, it may destroy the uniformity, in particular the laminar flow performance of the shielding gas, which in turn affects the quality of the weld joints.

Apart from these, there are also other possible problems in reality. Therefore, existing laser welding devices need to be improved to improve the laser welding process.

SUMMARY

Embodiments of the present invention provide a gas assistance device for laser welding. The gas assistance device includes an assistance gas unit configured to apply an assistance gas to a site to be welded, and a fume suction unit configured to suck fumes generated during laser welding. The assistance gas unit is provided with an assistance gas nozzle. The fume suction unit is provided with a fume suction port. The assistance gas nozzle includes a first slit-shaped opening. The fume suction port includes a second slit-shaped opening. The fume suction unit is at least partially attached to the assistance gas unit. In an operating state of the gas assistance device, the second slit-shaped opening is at least partially located above the first slit-shaped opening.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
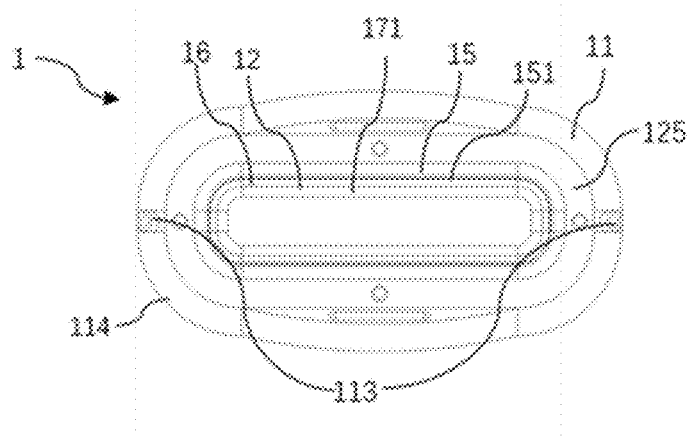
FIG. 1 shows a top view of a gas assistance device for laser welding according to an exemplary embodiment of the disclosure.

Embodiments of the present disclosure provide an improved gas assistance device for laser welding and a corresponding laser welding system.

According to a first aspect of the disclosure, provided is a gas assistance device for laser welding, which comprises: an assistance gas unit, which is configured to apply an assistance gas, such as a shielding gas, to a site to be welded and is thus provided with an assistance gas nozzle; and a fume suction unit, which is configured to suck fumes generated during laser welding and is thus provided with a fume suction port, wherein the assistance gas nozzle comprises a first slit-shaped opening, the fume suction port comprises a second slit-shaped opening, the fume suction unit is at least partially attached to the assistance gas unit, and in an operating state of the gas assistance device, the second slit-shaped opening is at least partially located above the first slit-shaped opening.

According to an optional embodiment of the disclosure, the gas assistance device is configured in an annular shape.

According to an optional embodiment of the disclosure, the gas assistance device comprises a flow direction limiting structure provided between the assistance gas nozzle and the fume suction port, wherein the flow direction limiting structure is configured to direct the fumes to flow towards the fume suction port.

According to an optional embodiment of the disclosure, the first slit-shaped opening and the second slit-shaped opening extend in parallel.

According to an optional embodiment of the disclosure, the gas assistance device is configured to have an upper opening and a lower opening directly opposite the upper opening, wherein the upper opening is larger than the lower opening, and the assistance gas nozzle is located at an edge of the lower opening.

According to an optional embodiment of the disclosure, the fume suction port is provided on an inner side of the gas assistance device.

According to an optional embodiment of the disclosure, the flow direction limiting structure is configured to direct the fumes to flow towards the fume suction port in a direction at 1° to 9°, such as at 5°, to a horizontal direction.

According to an optional embodiment of the disclosure, the gas assistance device is configured to have its inner side and/or outer side at least partially extending outwards in an inclined manner from bottom to top in a vertical direction in the operating state.

According to an optional embodiment of the disclosure, the fume suction port is arranged on the inner side substantially centrally in the vertical direction.

According to an optional embodiment of the disclosure, the assistance gas unit is at least partially configured as an outer ring structure, the fume suction unit is at least partially configured as an inner ring structure, and the inner ring structure is embedded within the outer ring structure.

According to an optional embodiment of the disclosure, the first slit-shaped opening is configured to circle around.

According to an optional embodiment of the disclosure, the second slit-shaped opening is configured to circle around.

According to an optional embodiment of the disclosure, the fume suction port is formed on the inner ring structure.

According to an optional embodiment of the disclosure, the fume suction port opens downwards in an inclined inwards manner.

According to an optional embodiment of the disclosure, the assistance gas nozzle opens downwards in an inclined inwards manner.

According to an optional embodiment of the disclosure, the assistance gas nozzle is configured to cause the assistance gas to flow out in a laminar flow manner.

According to an optional embodiment of the disclosure, the fume suction port has an orientation substantially the same as that of the assistance gas nozzle.

According to an optional embodiment of the disclosure, the flow direction limiting structure comprises a first protrusion.

According to an optional embodiment of the disclosure, the inner side of the gas assistance device is provided with a second protrusion for defining a suction channel fluidly connected to the fume suction port.

According to an optional embodiment of the disclosure, the first protrusion is configured to have a triangular cross-section.

According to an optional embodiment of the disclosure, the inner side of the gas assistance device is configured to define groove between the first protrusion and the second protrusion so that the fumes pass through the groove to flow into the fume suction port.

According to an optional embodiment of the disclosure, the fume suction port is arranged at a lower edge of the second protrusion.

According to an optional embodiment of the disclosure, the second protrusion is formed, in a lower-end region on its inner side, with a ramp inclined towards the fume suction port.

According to an optional embodiment of the disclosure, the second protrusion extends to an upper edge of the gas assistance device.

According to an optional embodiment of the disclosure, a first side of the triangular cross-section extends from an area adjacent to the assistance gas nozzle to the groove to form an inner surface of the first protrusion.

According to an optional embodiment of the disclosure, a second side of the triangular cross-section defines the groove.

According to an optional embodiment of the disclosure, the fume suction port faces the groove.

According to an optional embodiment of the disclosure, the first protrusion is configured in an annular shape.

According to an optional embodiment of the disclosure, the second protrusion is configured in an annular shape.

According to an alternative embodiment of the disclosure, the groove is configured in an annular shape.

According to an optional embodiment of the disclosure, the gas assistance device further comprises at least one assistance gas inlet port fluidly connected through an assistance gas channel to the assistance gas nozzle.

According to an optional embodiment of the disclosure, the gas assistance device further comprises at least one fume discharge port fluidly connected to the fume suction port.

According to an optional embodiment of the disclosure, the gas assistance device further comprises a top and an inclined edge arranged adjacent to the top on an outer side thereof, which is inclined downwards away from the top.

According to an optional embodiment of the disclosure, a gas uniform distribution structure for enabling the assistance gas to be ejected uniformly out of the assistance gas nozzle is provided in the assistance gas channel.

According to an optional embodiment of the disclosure, the at least one assistance gas inlet port includes at least two assistance gas inlet ports evenly arranged in a circumferential direction on the inclined edge.

According to an optional embodiment of the disclosure, the at least one fume discharge port includes at least two fume discharge ports evenly arranged in the circumferential direction on the top.

According to an optional embodiment of the disclosure, the gas uniform distribution structure is configured as a grid structure and/or an orifice plate structure.

According to an optional embodiment of the disclosure, the top is configured in an annular shape, and the inclined edge surrounds the top circumferentially.

According to an optional embodiment of the disclosure, the gas assistance device is configured to be adapted to weld a battery case cover plate of lithium batteries.

According to an optional embodiment of the disclosure, the gas assistance device is at least partially made of metal through 3D printing technology, in particular through selective laser melting printing technology.

According to an optional embodiment of the disclosure, the gas assistance device is formed by joining multiple modules together.

According to an optional embodiment of the disclosure, the fume suction unit is at least in part removably attached to the assistance gas unit.

According to an optional embodiment of the disclosure, the gas assistance device is integrally formed.

According to a second aspect of the disclosure, provided is a laser welding system, wherein the laser welding system at least comprises the gas assistance device according to any of the above embodiments.

According to some exemplary embodiments of the present disclosure, the structure can be simplified, with an enhanced level of integration of the device, and the suction performance and weld joint quality can also be improved.

For a clearer understanding of the technical problems to be solved, technical solutions and advantageous technical effects of the present disclosure, the disclosure will be further described below in details in conjunction with the drawings and a number of exemplary embodiments. It is to be understood that specific embodiments described herein are merely for explaining the disclosure, rather than limiting the scope of protection of the disclosure.

For the sake of clarity of the description, directional or orienting terms may be used herein. However, unless otherwise stated, any directional or orienting terms involved denote the usage in usual situations, but this does not mean that the direction or orientation applies to all scenes.

FIG. 1 shows a top view of a gas assistance device for laser welding according to an exemplary embodiment of the disclosure.

Figure 2:
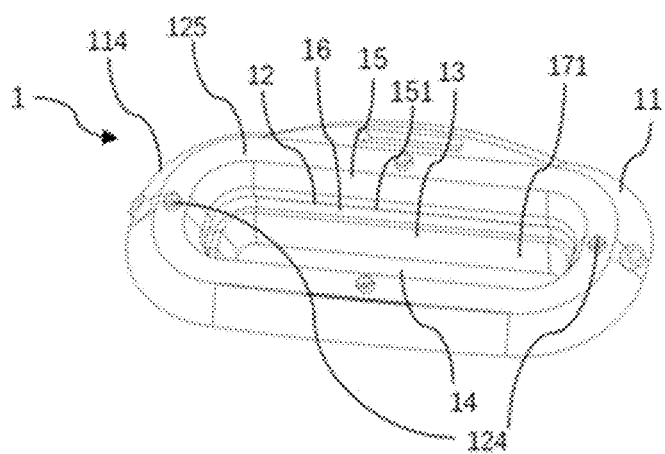
FIG. 2 shows a perspective view of a gas assistance device for laser welding according to an exemplary embodiment of the disclosure.

FIG. 2 shows a perspective view of a gas assistance device for laser welding according to an exemplary embodiment of the disclosure.

Figure 3:
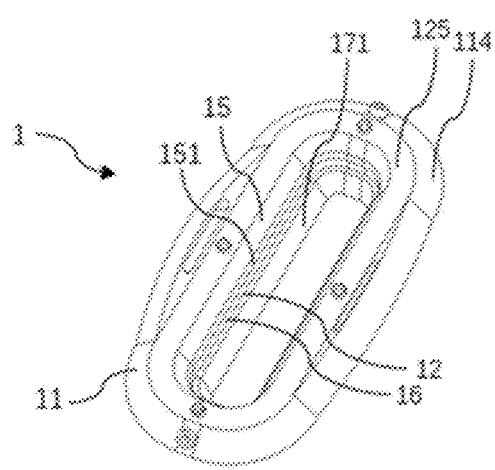
FIG. 3 shows a perspective view of the gas assistance device shown in FIG. 2 from a perspective different from FIG. 2.

FIG. 3 shows a perspective view of the gas assistance device shown in FIG. 2 from a perspective different from FIG. 2.

Figure 4:
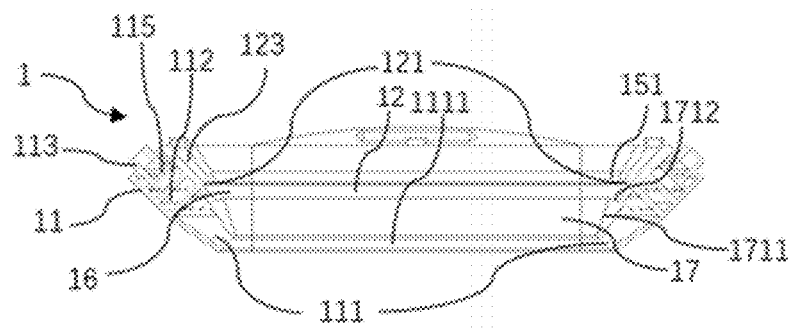
FIG. 4 shows a cross-sectional view of a gas assistance device for laser welding according to an exemplary embodiment of the disclosure to show its internal structure.

FIG. 4 shows a cross-sectional view of a gas assistance device for laser welding according to an exemplary embodiment of the disclosure to show its internal structure.

Figure 5:
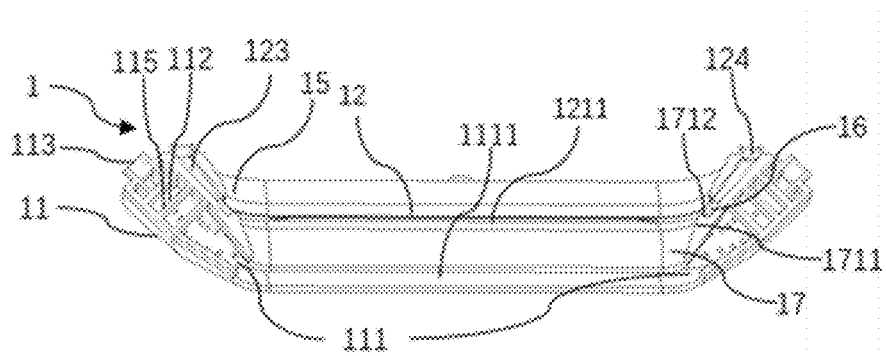
FIG. 5 shows a perspective cross-sectional view of a gas assistance device for laser welding according to an exemplary embodiment of the disclosure.

FIG. 5 shows a perspective cross-sectional view of a gas assistance device for laser welding according to an exemplary embodiment of the disclosure.

Figure 6:
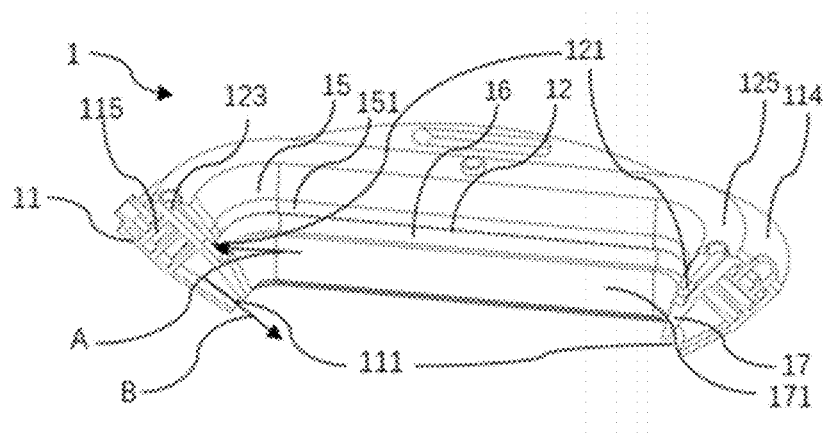
FIG. 6 shows a perspective cross-sectional view of the gas assistance device shown in FIG. 5 from a perspective different from FIG. 5.

FIG. 6 shows a perspective cross-sectional view of the gas assistance device shown in FIG. 5 from a perspective different than FIG. 5.

Before starting the description, it should be noted first that some reference numbers are not marked throughout all views due to the angle of view and the space limitation on marking of the reference numbers. Therefore, when referring to the description, multiple views may be referred to simultaneously to facilitate understanding, but this does not mean that each of the features must appear throughout all embodiments.

First, according to one aspect of the present disclosure, with reference to FIGS. 1 to 6, provided is a gas assistance device 1 for laser welding, which comprises: an assistance gas unit 11, which is configured to apply an assistance gas, such as a shielding gas, to a site to be welded and is thus provided with an assistance gas nozzle 111; and a fume suction unit 12, which is configured to suck fumes generated during laser welding and is thus provided with a fume suction port 121, wherein the assistance gas nozzle 111 comprises a first slit-shaped opening 1111, the fume suction port 121 comprises a second slit-shaped opening 1211, the fume suction unit 12 is at least partially attached to the assistance gas unit 11, and in an operating state of the gas assistance device 1, the second slit-shaped opening 1211 is at least partially located above the first slit-shaped opening 1111. Through such an attachment, the fume suction unit 12 can be fixed in position relative to the assistance gas unit 11 and thus can move therewith.

Here, "gas assistance device" involves the control and regulation of gases during the welding process, mainly including the supply of shielding gases by blowing and the suction of fumes.

The gas assistance device is suitable for use in the laser welding of a lithium battery case. During the laser welding process, the application of an assistance gas enables the laser welding to be carried out under the desired conditions. The assistance gas can not only act as a shielding gas to prevent oxidation and reduce porosity, but also affect the appearance of weld joints. Therefore, for those skilled in the art, the assistance gas may be any gas that is beneficial to achieving the desired welding quality, such as an inert gas.

As shown in FIGS. 1 to 3, and referring to FIGS. 4 to 6 as well, the gas assistance device 1 is in an assembled state. In this assembled state, the gas assistance device 1 is in the shape of a closed ring with an upper opening 13 and a lower opening 14. For example, for welding of the battery case cover plate and the battery case body, the lower opening may be slightly larger than the battery, such as by about 10 mm in all circumferential directions. A circle of assistance gas nozzles 111 are provided at a lower edge on an inner side of the closed ring. For laser welding of the lithium battery case, a site to be welded between the battery case body and the battery case cover plate is positioned at the lower opening 14 adjacent to the assistance gas nozzles 111, so that an assistance gas can be applied during the laser welding process to the site to be welded to assist in the laser welding process to achieve good welding quality. At the same time, during the welding process, fumes will gather in a cavity in the middle area of the gas assistance device 1, and the fumes will be sucked from above through the fume suction port 121. For this reason, the fume suction opening 121 is provided on the inner side of the gas assistance device 1. In addition, in order to avoid the suction of fumes from affecting the protection for the site to be welded by the assistance gas, it is necessary to minimize the influence on the desired flow pattern of the assistance gas, to avoid turbulence in the assistance gas. To this end, the fume suction port 121 is configured to suck fumes in a manner that does not affect the desired flow pattern of the assistance gas, in particular in a manner not affecting the laminar flow ejection of the assistance gas. Therefore, the relative arrangement and positional relationship between the assistance gas nozzle 111 and the fume suction port 121 are crucial.

According to an exemplary embodiment of the disclosure, as shown in FIGS. 4, 5 and 6, the gas assistance device 1 comprises a flow direction limiting structure 17 provided between the assistance gas nozzle 111 and the fume suction port 121, which flow direction limiting structure 17 is configured to direct fumes to flow towards the fume suction port 121 in direction A (see FIG. 5).

According to an exemplary embodiment of the disclosure, in the operating state, the direction A is at 1° to 9°, such as at 5°, to a horizontal direction. In this way, fumes can be sucked in a nearly horizontal direction without disturbing flowing of the shielding gas below.

According to an exemplary embodiment of the disclosure, the first slit-shaped opening 1111 and the second slit-shaped opening 1211 extend in parallel. As a result, the first slit-shaped opening 1111 ejects the shielding gas in a laminar flow manner below, and meanwhile the second slit-shaped opening 1211 smoothly sucks fumes above without adversely affecting the ejection of the shielding gas below.

According to an exemplary embodiment of the disclosure, the gas assistance device 1 is configured to have its inner side and/or outer side at least partially extending outwards in an inclined manner from bottom to top in a vertical direction in the operating state. In particular, it is inclined outwards from bottom to top in the entire circumference so that the upper opening is larger than the lower opening.

According to an exemplary embodiment of the disclosure, the fume suction port 121 is arranged on the inner side substantially centrally in the vertical direction.

According to an exemplary embodiment of the disclosure, the assistance gas unit 11 is at least partially configured as an outer ring structure, the fume suction unit 12 is at least partially configured as an inner ring structure, and the inner ring structure is embedded within the outer ring structure. Preferably, the fume suction port 121 is formed on the inner ring structure.

According to an exemplary embodiment of the disclosure, the first slit-shaped opening 1111 is configured to circle around. In particular, for welding of the lithium battery case, the battery case cover plate needs to be welded to the battery case body over the entire circumference, so the first slit-shaped opening 1111 circling around can eject the assistance gas, in particular shielding gas, to each of the welded sites.

Similarly, the second slit-shaped opening 1211 is also configured to circle around, thereby enabling suction from all sides.

As shown in FIGS. 4, 5 and 6, according to an exemplary embodiment of the disclosure, the assistance gas nozzle 111 opens downwards in an inclined inwards manner so that the assistance gas is ejected from the assistance gas nozzle 111 in direction B. During welding, the site to be welded is located at an edge of the lower opening, so the assistance gas nozzle 111 opening downwards in an inclined inwards manner can blow the assistance gas right towards the welded site.

Similarly, the fume suction port 121 opens downwards in an inclined inwards manner. Preferably, the fume suction port 121 has an orientation substantially the same as that of the assistance gas nozzle 111.

According to an exemplary embodiment of the disclosure, the flow direction limiting structure 17 comprises a first protrusion 171.

According to an exemplary embodiment of the disclosure, the inner side of the gas assistance device 1 is provided with a second protrusion 15 for defining a suction channel 123 fluidly connected to the fume suction port 121.

Preferably, the first protrusion 171 and the second protrusion 15 have different angles of inclination. According to an exemplary embodiment of the disclosure, the first protrusion 171 has an angle of inclination relative to the horizontal plane larger than that of the second protrusion 15.

According to an exemplary embodiment of the disclosure, as shown in FIG. 5, the first protrusion 171 is configured to have a triangular cross-section.

According to an exemplary embodiment of the disclosure, the inner side of the gas assistance device 1 is configured to define a groove 16 between the first protrusion 171 and the second protrusion 15 so that the fumes pass through the groove 16 to flow into the fume suction port 121.

According to an exemplary embodiment of the disclosure, the fume suction port 121 is arranged at a lower edge of the second protrusion 15. In particular, the fume suction opening 121 is arranged facing the groove 16. In this case, fumes first enter the groove 16 and then are redirected into the fume suction port 121.

According to an exemplary embodiment of the disclosure, the second protrusion 15 is formed, in a lower-end region on its inner side, with a ramp 151 inclined towards the fume suction port 121.

According to an exemplary embodiment of the disclosure, the second protrusion 15 extends to an upper edge of the gas assistance device 1.

According to an exemplary embodiment of the disclosure, a first side 1711 of the triangular cross-section of the first step 171 extends from an area adjacent to the assistance gas nozzle 111 to the groove 16 to form an inner surface of the first protrusion 171. In particular, a second side 1712 of the triangular cross-section defines the groove 16.

According to an exemplary embodiment of the disclosure, the first protrusion 171 is configured in an annular shape. Similarly, the second protrusion 15 is also configured in an annular shape. In this case, the groove 16 may also be configured in an annular shape.

According to an exemplary embodiment of the disclosure, as shown in FIGS. 4 and 6, the gas assistance device 1 further comprises at least one assistance gas inlet port 113 fluidly connected through an assistance gas channel 112 to the assistance gas nozzle 111. The assistance gas inlet port 113 may receive the assistance gas from an assistance gas supply source (not shown) through, for example, a delivery tube (not shown), preferably a hose.

According to an exemplary embodiment of the disclosure, a gas uniform distribution structure 115 for enabling the assistance gas to be ejected uniformly out of the assistance gas nozzle 111 is provided in the assistance gas channel 112. This is very important for the formation of a laminar flow of the assistance gas.

According to an exemplary embodiment of the disclosure, the gas uniform distribution structure 115 is configured as a grid structure and/or an orifice plate structure. The grid structure and/or the orifice plate structure not only allows the assistance gas to flow diffusely to the assistance gas nozzle 111 so that the assistance gas can be ejected uniformly out of the assistance gas nozzle 111, but also increases the flow path of the assistance gas so that the assistance gas is in repeated contact with different parts of the grid structure and/or the orifice plate structure, which is advantageous to the heat dissipation of the assistance gas when cooling is required, and this is also beneficial to laser welding.

According to an exemplary embodiment of the disclosure, the gas assistance device 1 further comprises at least one fume discharge port 124 fluidly connected to the fume suction port 121. The fume discharge port 124 may be connected to a suction pump (not shown), for example, by a hose.

According to an exemplary embodiment of the disclosure, see FIGS. 1 to 3 for example, the gas assistance device 1 further comprises a top 125 and an inclined edge 114 arranged adjacent to the top 125 on an outer side thereof, which is inclined downwards away from the top 125.

According to an exemplary embodiment of the disclosure, the at least one assistance gas inlet port 113 includes at least two assistance gas inlet ports evenly arranged in a circumferential direction on the inclined edge 114. The embodiment shown in the drawings contains two assistance gas inlet ports arranged opposite each other, but those skilled in the art may understand that it is not limited to this in practice. The supply of the assistance gas to the assistance gas inlet ports may be selectively controlled according to the needs, and preferably, different assistance gas inlet ports are in correspondence to assistance gas nozzles in different areas so that, depending on the site that is being welded, the application of the assistance gas to this welded site can be selectively controlled.

According to an exemplary embodiment of the disclosure, the at least one fume discharge port 124 includes at least two fume discharge ports evenly arranged in the circumferential direction on the top 125. The embodiment shown in the drawings contains four fume discharge ports. Similarly, the fume discharge ports in different areas may also be selectively controlled to achieve the suction effect on corresponding areas.

According to an exemplary embodiment of the disclosure, the top 125 is configured in an annular shape, and the inclined edge 114 surrounds the top 125 circumferentially, so it is also in an annular shape.

According to an exemplary embodiment of the disclosure, the gas assistance device 1 is at least partially made of metal through 3D printing technology, in particular through selective laser melting printing technology. In particular, the entire gas assistance device 1 is integrally formed.

However, those skilled in the art may understand that plastic materials may also be considered according to different thermal demands of welding. Manufacturing through 3D printing technology is conducive to processing more complicated internal structures. Moreover, 3D printing technology allows those battery case cover plates in different shapes to be flexibly processed and adjusted.

Of course, the gas assistance device 1 may also be formed by joining multiple modules together.

According to an exemplary embodiment of the disclosure, the fume suction unit 12 is at least in part removably attached to the assistance gas unit 11. In particular, the fume suction unit 12 may be attached to the assistance gas unit 11 as an inner ring structure.

According to the present disclosure, welding can be performed with not only a stationary welding head, but also with a scanner welding head.

According to another aspect of the present disclosure, provided is a laser welding system, wherein the laser welding system at least comprises the gas assistance device according to any of the above exemplary embodiments.

For those skilled in the art, it is obvious that the technical idea of the present disclosure is not limited to the laser welding of lithium battery cases; instead, it is also applicable to the welding of structures in any other shapes. Also, it is not limited to a fully encircled arrangement, but is adjustable according to the actual welding needs.

While specific embodiments of the disclosure have been described in detail here, they have been presented for the purpose of explanation only and should not be construed as limitations on the scope of the present disclosure. Various substitutions, changes and modifications can be devised without deviating from the spirit and scope of the present disclosure.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A gas assistance device for laser welding, the gas assistance device comprising:
    an assistance gas unit configured to apply an assistance gas to a site to be welded, wherein the assistance gas unit is provided with an assistance gas nozzle; and
    a fume suction unit configured to suck fumes generated during laser welding, wherein the fume suction unit is provided with a fume suction port,
    wherein the assistance gas nozzle comprises a first slit-shaped opening, the fume suction port comprises a second slit-shaped opening, the fume suction unit is at least partially attached to the assistance gas unit, and in an operating state of the gas assistance device, the second slit-shaped opening is at least partially located above the first slit-shaped opening, and
    wherein the assistance gas unit is at least partially configured as an outer ring structure, the fume suction unit is at least partially configured as an inner ring structure, and the inner ring structure is embedded within the outer ring structure.

2. The gas assistance device for laser welding according to claim 1, wherein
    the gas assistance device is configured in an annular shape; and/or
    the gas assistance device comprises a flow direction limiting structure provided between the assistance gas nozzle and the fume suction port, wherein the flow direction limiting structure is configured to direct the fumes to flow towards the fume suction port; and/or
    the first slit-shaped opening and the second slit-shaped opening extend in parallel.

3. The gas assistance device for laser welding according to claim 2, wherein
    the gas assistance device is configured to have an upper opening and a lower opening directly opposite the upper opening, wherein the upper opening is larger than the lower opening, and the assistance gas nozzle is located at an edge of the lower opening; and/or
    the fume suction port is provided on an inner side of the gas assistance device; and/or
    the flow direction limiting structure is configured to direct the fumes to flow towards the fume suction port in a direction at 1° to 9° with respect to a horizontal direction.

4. The gas assistance device for laser welding according to claim 3, wherein
    the gas assistance device is configured to have the inner side and/or an outer side at least partially extending outwards in an inclined manner from bottom to top in a vertical direction in the operating state; and/or the fume suction port is arranged on the inner side centrally in the vertical direction.

5. The gas assistance device for laser welding according to claim 2, wherein the first slit-shaped opening is configured to circle around; and/or the second slit-shaped opening is configured to circle around.

6. The gas assistance device for laser welding according to claim 3, wherein the assistance gas unit is at least partially configured as an outer ring structure, the fume suction unit is at least partially configured as an inner ring structure, and the inner ring structure is embedded within the outer ring structure; and/or the first slit-shaped opening is configured to circle around; and/or the second slit-shaped opening is configured to circle around.

7. The gas assistance device for laser welding according to claim 4, wherein the assistance gas unit is at least partially configured as an outer ring structure, the fume suction unit is at least partially configured as an inner ring structure, and the inner ring structure is embedded within the outer ring structure; and/or the first slit-shaped opening is configured to circle around; and/or the second slit-shaped opening is configured to circle around.

8. The gas assistance device for laser welding according to claim 5, wherein the fume suction port is formed on the inner ring structure; and/or the fume suction port opens downwards in an inclined inwards manner; and/or the assistance gas nozzle opens downwards in the inclined inwards manner; and/or the assistance gas nozzle is configured to cause the assistance gas to flow out in a laminar flow manner.

9. The gas assistance device for laser welding according to claim 2, wherein the fume suction port has an orientation that is substantially same as an orientation of the assistance gas nozzle; and/or the flow direction limiting structure comprises a first protrusion; and/or an inner side of the gas assistance device is provided with a second protrusion for defining a suction channel fluidly connected to the fume suction port.

10. The gas assistance device for laser welding according to claim 3, wherein the fume suction port has an orientation that is substantially same as an orientation of the assistance gas nozzle; and/or the flow direction limiting structure comprises a first protrusion; and/or the inner side of the gas assistance device is provided with a second protrusion for defining a suction channel fluidly connected to the fume suction port.

11. The assistance device for laser welding according to claim 9, wherein the first protrusion is configured to have a triangular cross-section; and/or the inner side of the gas assistance device is configured to define a groove between the first protrusion and the second protrusion so that the fumes pass through the groove to flow into the fume suction port.

12. The gas assistance device for laser welding according to claim 9, wherein the fume suction port is arranged at a lower edge of the second protrusion; and/or the second protrusion is formed, in a lower-end region on an inner side thereof, with a ramp inclined towards the fume suction port; and/or the second protrusion extends to an upper edge of the gas assistance device.

13. The gas assistance device for laser welding according to claim 11, wherein the fume suction port is arranged at a lower edge of the second protrusion; and/or the second protrusion is formed, in a lower-end region on an inner side thereof, with a ramp inclined towards the fume suction port; and/or the second protrusion extends to an upper edge of the gas assistance device.

14. The gas assistance device for laser welding according to claim 11, wherein a first side of a triangular cross-section extends from an area adjacent to the assistance gas nozzle to the groove to form an inner surface of the first protrusion; and/or a second side of the triangular cross-section defines the groove; and/or the fume suction port faces the groove.

15. The gas assistance device for laser welding according to claim 11, wherein the first protrusion is configured in an annular shape; and/or the second protrusion is configured in the annular shape; and/or the groove is configured in the annular shape.

16. The gas assistance device for laser welding according to claim 1, wherein the gas assistance device further comprises at least one assistance gas inlet port fluidly connected through an assistance gas channel to the assistance gas nozzle; and/or the gas assistance device further comprises at least one fume discharge port fluidly connected to the fume suction port.

17. The gas assistance device for laser welding according to claim 1, further comprising:

a top surface and an inclined edge surface arranged adjacent to the top surface on an outer side thereof, which is inclined downwards away from the top surface; and/or a gas uniform distribution structure for enabling the assistance gas to be ejected uniformly out of the assistance gas nozzle, wherein the gas uniform distribution structure is provided in the assistance gas channel.

18. The gas assistance device for laser welding according to claim 17, wherein the at least one assistance gas inlet port comprises at least two assistance gas inlet ports evenly arranged in a circumferential direction on the inclined edge; and/or the at least one fume discharge port comprises at least two fume discharge ports evenly arranged in the circumferential direction on the top; and/or the gas uniform distribution structure is configured as a grid structure and/or an orifice plate structure; and/or the top is configured with an annular shape, and the inclined edge surrounds the top circumferentially.

19. The gas assistance device for laser welding according to claim 1, wherein the gas assistance device is configured to be adapted to welding a battery case cover plate of a lithium battery; and/or the gas assistance device is at least partially made of metal through 3D printing technology; and/or the gas assistance device is formed by joining multiple modules together; and/or the fume suction unit is at least in part removably attached to the assistance gas unit; or the gas assistance device is integrally formed.

20. A laser welding system comprising the gas assistance device according to claim 1.

* * * * *